Patented May 11, 1943

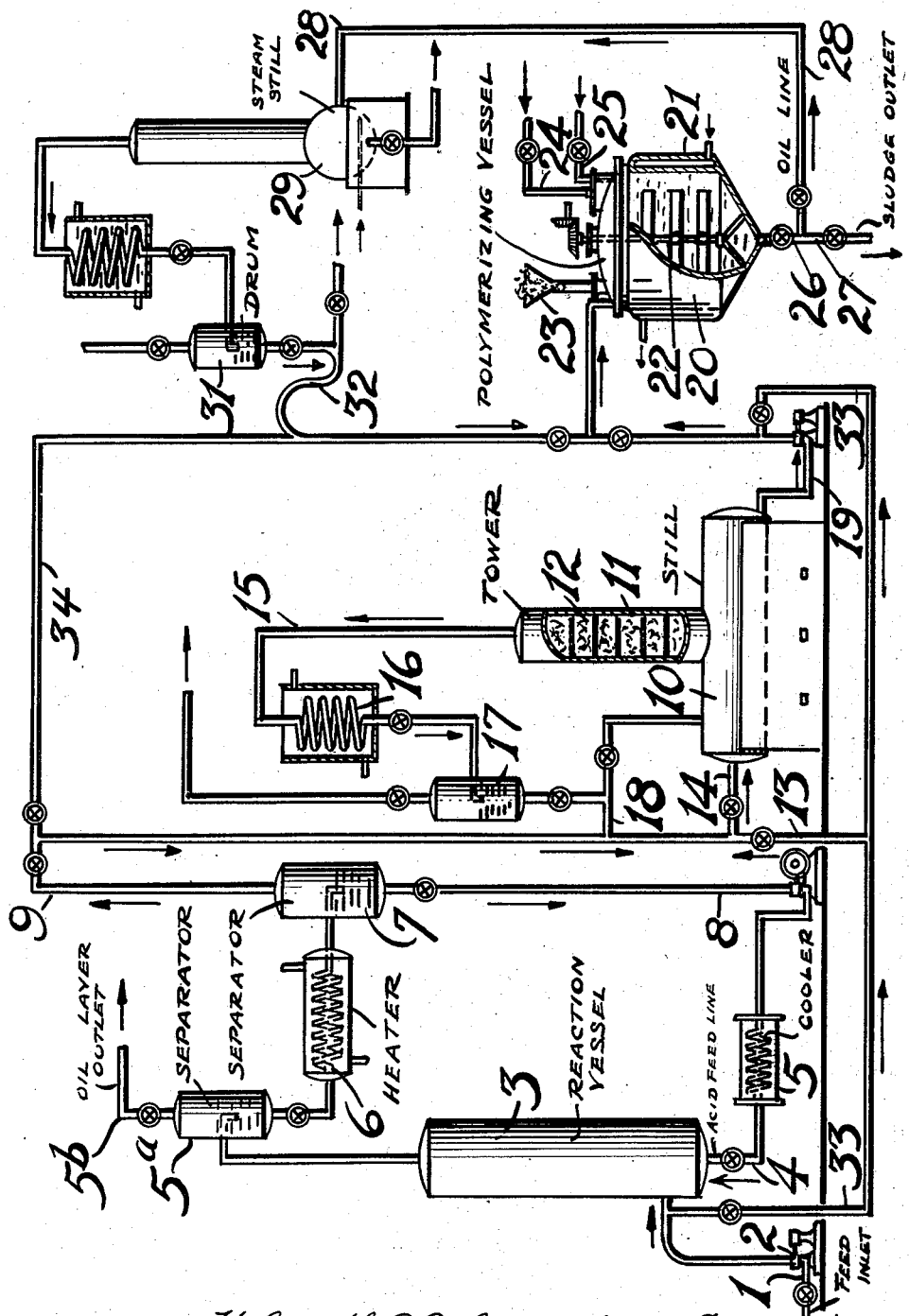

2,318,719

UNITED STATES PATENT OFFICE 2,318,719

METHOD FOR POLYMERIZING OLEFINS TO LUBRICATING OILS

Helmuth G. Schneider and Lewis A. Bannon, Roselle, N. J., assignors to Standard Oil Development Company, a corporation of Delaware Application May 20, 1938, Serial No. 210,792

15 Claims. (Cl. 196—10)

The present invention relates to the art of producing valuable oils from olefins and more specifically to an improved method for polymerizing olefins to lubricating oils. The invention will be fully understood from the following description:

The drawing is in semi-diagrammatic form and illustrates the flow of materials in the process.

It has long been known that olefins having low boiling points, even gaseous olefins, can be polymerized to higher boiling products including lubricating oils, but the processes which have been suggested heretofore have been unsatisfactory either from the point of view of oil quality or of yield. One object of the present invention is to produce a valuable polymer oil of a range suitable for lubricating oils by polymerization of gaseous and low boiling olefins. By the use of the present process, oils of good quality are obtained in excellent yields.

Heretofore attempts have been made to polymerize low boiling olefins directly to lubricating oils in a single step and various catalysts and conditions of temperature and pressure have been suggested, but none of the combinations has proved to be eminently successful. In certain instances, for example, at low temperatures, polymerization is too extensive and while some lubricating oil fractions are produced, a great portion of the olefin is polymerized to materials of considerably higher molecular weights than are desirable for lubricating oil purposes, and under higher temperature conditions, while polymerization is less rapid, the quality of the oil is found to be wanting. There appears to be no middle ground in which reasonably good yields of a good quality oil can be obtained and while the reasons for this are not clearly apparent, it is believed that this results from the fact that the best polymerizing conditions for monomeric olefins are not the same as those for dimers and trimers and that, therefore, the single step polymerization process cannot be other than an unsatisfactory compromise.

It has been found that much better results can be obtained by conducting the polymerization in a series of at least two stages, operating under different conditions, so that the molecular weight of the polymer products is gradually increased in stages. It is particularly important that the first stage of polymerization, that is to say the stage in which monomers are converted to dimers and trimers, should be segregated from the stages in which higher olefins, not yet of the molecular weight suitable for lubricating oils, are converted into such products. Thus it is found that at least two stages are highly desirable to obtain good yields of good grade oils. Further improvements can be obtained by introducing further steps or stages of polymerization. Thus in the first step monomers such as ethylene, propylene, butylene, isobutylene, amylene or mixtures of these hydrocarbons are polymerized to low molecular weight products of the range of mainly dimers and trimers. In a second stage, the polymers of the first stage are re-polymerized to higher molecular weight products; for example, they may be polymerized directly to lubricating oils or preferably the polymerization may be halted when mainly tetramers and pentamers are produced. Lubricating oils may then be produced in a third or final stage of polymerization.

Turning to the drawing, reference numeral 1 denotes a line which is used for supplying olefin or olefin mixtures to the polymerization equipment. The olefin may be ethylene or propylene in which case the material is most conveniently in gas phase, or butylene or amylene in which it is preferably maintained in liquid phase. The preferred olefin for the present process is isobutylene and in the subsequent discussion this olefin will be referred to specifically, although it must be remembered that other olefins may be used although with less satisfactory results.

A pump 2 forces the liquefied isobutylene into the lower portion of a preliminary reaction vessel 3 into which sulfuric acid or other similar non-volatile acid polymerization catalyst is conducted by pipe 4. The acid is cooled in a cooler 5 prior to admixture with the olefin and this mixture passes upwardly through the reaction vessel 3 wherein the isobutylene is absorbed by the acid presumably as an alkyl ester. If the feed stock contains isobutylene along with materials which are not absorbed under the conditions imposed, the exit material will consist of two phases, one comprising the acid with the absorbed isobutylene, the other comprising the unabsorbed hydrocarbon. These may be separated in a separator 5a, the upper or oily layer being withdrawn by a pipe 5b. If substantially pure isobutylene is used, there will be a complete solution in the acid, but in any case the acid layer is forced through a heater 6 wherein the mixture is raised to the polymerizing temperature. The oil polymer which consists mainly of dimers and trimers separates from the acid in a separator 7 and the acid is drawn off and returned to the reaction vessel by a pipe 8.

The polymer, consisting mainly of di- and tri-isobutylene, contains no lubricating oil fractions and is taken off by a pipe 9. It may be purified, for example by washing with water or alkali, or may be re-distilled, but these steps are not shown on the drawing for simplification. The material is now ready for secondary polymerization. This is accomplished by passing the preliminary polymer into a still 10 which is surmounted by a tower 11. This tower may be filled with a polymerizing catalyst 12. The still is heated so that the primary polymer is vaporized and passes upward through the catalyst which effects polymerization principally to tetramer and hexamer fractions. It is desirable to add a small amount of monomeric olefin to the still at pipes 13 and 14, but the amount is quite small in proportion to the amount of secondary polymer present. The heavier repolymerized material refluxes to the still 10 while a portion of the lighter material passes overhead by pipe 15. This overhead fraction is preferably condensed in the cooler 16, collected at 17 and may be returned to the still 10 by means of the pipe 18.

This secondary polymerization may be conducted in liquid phase if desired. For example, a suitable type of catalytic clay such as fuller's earth, acid treated clay, Japanese acid clay, and the like may be added directly to the still or the process may be made continuous by adding the clay to the oil in pipe 9 and the slurry of oil and clay passed through a coil heated to polymerizing temperature as will be disclosed below.

The secondary polymer is withdrawn from the still 10 by a pipe 19 and usually no further purification is necessary. It is passed now to the final polymerizing vessel 20 which is conveniently in the form of an agitator with a temperature regulating jacket 21 and a stirring mechanism 22. Catalyst if in a solid condition may be added by means of the hopper 23, or if gaseous by the pipe 24. After polymerization a hydrolyzing agent such as water or alcoholic or aqueous alkali may be added by pipe 25 and sludge may be drawn off by pipes 26 and 27.

The oil, which is now increased in molecular weight to the range of lubricating oils, may be washed or otherwise purified within the agitator and is withdrawn by pipes 26 and 28 to a steam still 29 which is used to remove low boiling fractions and to obtain the proper flash. The low boiling materials removed are collected in the drum 31 and may be returned to polymerizer 20 by the pipe 32. In this case, as in the prior polymerization, it is found advisable to add a small amount of monomeric olefin during polymerization and this is accomplished by means of a pipe 33.

The process and apparatus disclosed above is exceedingly flexible and capable of producing high yields of excellent oils. It is particularly important, as indicated above, to segregate at least two polymerization stages, the first in which the monomeric olefins are converted to dimers and trimers and the later stages for re-polymerization. In the drawing, three such stages have been shown but it will be understood that the intermediate stage may be omitted if desired, and the mixture of dimers and trimers may be passed directly from the vessel 7 to the final polymerizer 20 by means of the pipe 9 and the branched pipe 34.

In carrying out the present process, the essential feature is to gradually increase the molecular weight of the olefinic material being polymerized in successive stages and conditions, catalysts and the like are utilized and adapted to obtain this gradual stepwise increase in molecular weight, rather than to produce lubricating oils in a single stage. The present process has as its object the production, first, of a polymer of low molecular weight, which is itself unsatisfactory as a lubricating oil and, secondly, to re-polymerize the same in a single or in several stages into the lubricating oil range.

It is particularly important that the first stage be quite isolated from the remaining stages and it is preferred to utilize for this purpose a non-volatile mineral acid catalyst such as sulfuric or phosphoric acid, especially ortho phosphoric acid. An acid strength of 50 to about 100% may be used for absorption and thereafter the temperature should be raised to 100 to 300° F. to effect polymerization. It will be understood that with stronger acids, lower temperatures may be used and in any case temperatures and acid strengths should be adjusted with each other so as to prevent carbonization and to obtain polymerization, preferably to the range of dimers and trimers. With phosphoric acid, somewhat higher temperatures are required than with sulfuric acid; for example, using 50 to 85% acid, the temperature range is from say 150 to 350° F.

Other catalysts may be employed such as Friedel-Crafts type catalysts, but care should be taken not to obtain too extensive reaction, and with such catalysts it is usually found that relatively small amounts of an excessively high polymer cannot be avoided. This fraction should be removed prior to the secondary polymerization. If a two stage polymerization process is to be employed, the catalyst for the second stage is preferably a Friedel-Crafts type catalyst. The better catalysts of this type are the active metal halide catalysts such as aluminum chloride or bromide, zinc chloride, iron chloride and the like, but active metalloid halide catalysts may also be employed such as boron fluoride, silicon fluoride and the like or their complex compounds. For example, using aluminum chloride or other metal halides, the temperature range is from about 50° to 350° F., but preferably in the range from 100° to 250° F. with aluminum chloride. With boron fluoride as the catalyst, the temperatures are ordinarily in the range from 50° to 125° F. In this stage of the process dimers, trimers and tetramers may be polymerized to lubricating oils without difficulty.

While the two stage process just outlined is satisfactory, it is preferred to insert an intermediate polymerization between the two stages described heretofore. In the intermediate step the dimer to tetramer fractions are preferably polymerized but not into the lubricating oil range. Acid catalysts may be used for this stage under the same general conditions as in the first step but with the provision of longer time of contact. The preferred catalysts for this step, however, are clay type catalysts such as fuller's earth, acid treated clay, Japanese acid clays and the like, as well as synthetic gels made by precipitation or co-precipitation of alumina and silica with or without other metal oxides. These materials effect a rapid polymerization which, however, does not proceed to the lubricating oil range at temperatures from say 50° to 150° F. Oil vapors may be passed through the catalyst or the oil may be contacted in liquid condition.

The use of the second or intermediate polymerization step described heretofore does not greatly change the conditions used in the final step as disclosed before. The feed stock, however, is of a somewhat higher degree of polymerization and it is therefore not necessary to go so far in the final stage. Time of reaction and the amount of catalyst may be somewhat diminished, but, the general conditions of temperature are substantially the same.

The above process is particularly adapted to produce oils of the range from 50 to 100 seconds Saybolt at 210° F. and the conditions may be adjusted within the ranges indicated above to vary the yield of different viscosity fractions. The products are extremely clean lubricating oil stocks of low carbon depositing and sludging tendencies.

Example I

Isobutylene was polymerized mainly to dimer and trimer using 65% sulfuric acid at a temperature of 110° C., using a time of 0.5 to 1.5 minutes for contact. The product was washed free of acid, re-distilled, and 784 grams thereof placed in a closed container with 47 grams of boron fluoride. The initial pressure was 80 pounds per square inch at a temperature of 82° F. This was gradually increased to 475° F. and 345 pounds per sqaure inch over a period of 1½ hours. At the end of this time, the vessel was opened and the product was distilled by fire and steam, removing a considerable portion of unpolymerized dimer and trimer and recovering 32% of a good lubricating oil as a distillation residue. The oil was extremely clean, had a viscosity of 45 seconds Saybolt at 210° F., and 274 seconds Saybolt at 100° F. The unpolymerized material removed by distillation can be again subjected to the catalyst to increase yield.

Example II

In similar tests other catalysts and conditions were used as shown in the following table:

| Catalyst | Temperature | Oil characteristics | |
|---|---|---|---|
| | | Vis. 100° F. | Vis. 210° F. |
| | °F. | | |
| H₂O saturated with BF₃ | 50 | 138.9 | 39.7 |
| AlCl₃ | 212-230 | 352.7 | 46.5 |
| Do | 77 | 304.5 | 45.3 |
| BF₃ | 122 | 444.0 | 50.6 |

Example III

Isobutylene was polymerized to dimer just as in Example I and it was then polymerized to tetramer using an active clay catalyst at a temperature of about 122° F. The product was washed and re-distilled and was then polymerized with 5% aluminum chloride for a period of 3 hours at 60° F. The lubricating oil obtained amounted to 18% of the tetramer and had a viscosity of 50.1 seconds at 210° F. and 337 seconds at 100° F. A considerable proportion of the tetramer was unconverted by the catalyst. This material was re-polymerized under substantially the same conditions to give additional yield of lubricating oil of the same general quality.

The above invention is not to be limited to any of the specific examples given or any theories as to the mechanism of the operation of the invention, but only by the following claims in which it is intended to claim all novelty inherent in the invention as broadly as the prior art permits.

We claim:

1. An improved process for producing lubricating oils from isobutylene comprising conducting the polymerization in a series of separate successive steps so as to increase the molecular weight progressively in successive steps up to the lubricating oil range a first step of polymerization being accomplished with a non-volatile mineral acid catalyst and the products of said first step being re-polymerized to lubricating oils by means of a Friedel-Crafts type catalyst.

2. An improved process for producing lubricating oils from isobutylene comprising conducting the polymerization in a series of separate successive steps so as to increase the molecular weight progressively in successive steps up to the lubricating oil range a first step of polymerization being accomplished by means of sulphuric acid catalysts, and the product of the said first step being re-polymerized to lubricating oil by means of active halide catalyst of the Friedel-Crafts type.

3. An improved process for producing lubricating oils from isobutylene comprising conducting the polymerization in a series of separate successive steps so as to increase the molecular weight progressively in successive steps up to the lubricating oil range in which the catalyst for the first step is sulfuric acid and for the second aluminum chloride.

4. Process for producing lubricating oils from isobutylene comprising first polymerizing the isobutylene to the range of mainly dimers and trimers with a non-volatile mineral acid catalyst, re-polymerizing the product to a material below the lubricating oil range with an active earth catalyst and finally polymerizing this product to lubricating oils with a Friedel-Crafts type catalyst.

5. Process according to claim 4 in which sulfuric acid is employed in the first polymerization stage and aluminum chloride in the final stage.

6. Process according to claim 4 in which sulfuric acid is used in the first stage of polymerization and boron fluoride in the final stage.

7. The process of preparing lubricating oils comprising the steps of treating an isobutylene polymerizate mixture comprising mainly dimer and trimer, with a Friedel-Crafts type catalyst at temperatures ranging between room temperature and 350° F. for a prolonged period to produce a lubricating oil having a good viscosity and a good viscosity index.

8. The process of preparing lubricating oils comprising the steps of treating an isobutylene polymerizate mixture comprising mainly dimer and trimer, with a Friedel-Crafts type catalyst at temperatures ranging between room temperature and 350° F. for a prolonged period to produce a lubricating oil having a good viscosity and a good viscosity index, and thereafter washing out the catalyst material and distilling out low boiling and unreacted initial polymer to yield a polymeric oily material.

9. The process of preparing lubricating oils comprising the steps of treating an isobutylene polymerizate mixture comprising mainly dimer and trimer, with a Friedel-Crafts type catalyst at temperatures ranging between room temperature and 350° F. for a prolonged period, and thereafter washing out the catalyst material and distilling out low boiling and unreacted initial polymer to yield a polymeric oily material having a viscosity at 210° F. in excess of approximately 40.

10. The process of preparing lubricating oils comprising the steps of treating an isobutylene polymerizate mixture comprising mainly dimer and trimer, with a Friedel-Crafts type catalyst selected from the group aluminum chloride and boron trifluoride, at temperatures ranging between room temperature and 350° F. for a prolonged period.

11. The process of preparing lubricating oils comprising the steps of treating an isobutylene polymerizate comprising dimer, at temperatures ranging from room temperature up according to the heat of reaction with a Friedel-Crafts type catalyst to produce a higher polymer having a viscosity within the lubricating oil range, and in excess of approximately 40 at 210° F.

12. The process of preparing a lubricating oil comprising the step of treating isobutylene dimer with a Friedel-Crafts type catalyst at temperatures ranging between room temperature and 350° F. to yield a high molecular weight polymer of isobutylene characterized by having a viscosity within the lubricating oil range, above approximately 40 at 210° F.

13. The process of preparing a lubricating oil comprising the step of treating isobutylene trimer with a Friedel-Crafts type catalyst at temperatures ranging between room temperature and 350° F. to yield a high molecular weight polymer of isobutylene characterized by having a viscosity within the lubricating oil range above approximately 40 at 210° F.

14. The process of preparing a lubricating oil, comprising in sequence the steps of polymerizing isobutylene to a low polymer by the application thereto of a sulfuric acid catalyst, followed by the step of polymerizing the first polymerizate to a lubricating oil substance by the application to the first polymerizate of an active halide catalyst.

15. The process of preparing a lubricating oil, comprising in sequence the steps of polymerizing isobutylene to a low polymer by the application thereto of a sulfuric acid catalyst, followed by the step of polymerizing the first polymerizate to a lubricating oil substance by the application to the first polymerizate of an active halide catalyst comprising aluminum chloride.

HELMUTH G. SCHNEIDER.
LEWIS A. BANNON.